United States Patent
Jiang et al.

(10) Patent No.: US 11,908,103 B2
(45) Date of Patent: Feb. 20, 2024

(54) MULTI-SCALE-FACTOR IMAGE SUPER RESOLUTION WITH MICRO-STRUCTURED MASKS

(71) Applicant: TENCENT AMERICA LLC, Palo Alto, CA (US)

(72) Inventors: Wei Jiang, Sunnyvale, CA (US); Wei Wang, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 430 days.

(21) Appl. No.: 17/363,280

(22) Filed: Jun. 30, 2021

(65) Prior Publication Data
US 2022/0051367 A1 Feb. 17, 2022

Related U.S. Application Data

(60) Provisional application No. 63/065,608, filed on Aug. 14, 2020.

(51) Int. Cl.
*G06T 3/40* (2006.01)

(52) U.S. Cl.
CPC .......... *G06T 3/4053* (2013.01); *G06T 3/4046* (2013.01)

(58) Field of Classification Search
CPC .......................... G06T 3/4046; G06T 3/4053
See application file for complete search history.

(56) References Cited

U.S. PATENT DOCUMENTS

| 2004/0260662 | A1* | 12/2004 | Staelin | G06N 3/08 |
| | | | | 706/15 |
| 2017/0374374 | A1* | 12/2017 | Wang | H04N 19/46 |
| 2018/0268284 | A1* | 9/2018 | Ren | G06N 3/04 |
| 2021/0407042 | A1* | 12/2021 | Berthelot | G06T 3/4046 |

FOREIGN PATENT DOCUMENTS

WO 2020/102812 A1 5/2020

OTHER PUBLICATIONS

International Search Report dated Nov. 8, 2021 in International Application No. PCT/US21/41252.
Written Opinion of the International Searching Authority dated Nov. 8, 2021 in International Application No. PCT/US21/41252.

* cited by examiner

*Primary Examiner* — Shaghayegh Azima
(74) *Attorney, Agent, or Firm* — Sughrue Mion, PLLC (57) ABSTRACT

There is included a method and apparatus comprising computer code configured to cause a processor or processors to perform obtaining an input low resolution (LR) image comprising a height, a width, and a number of channels, implementing a feature learning deep neural network (DNN) configured to compute a feature tensor based on the input LR image, generating, by an upscaling DNN, a high resolution (HR) image, having a higher resolution than the input LR image, based on the feature tensor computed by the feature learning DNN, wherein a networking structure of the upscaling DNN differs depending on different scale factors, and wherein a networking structure of the feature learning DNN is a same structure for each of the different scale factors.

20 Claims, 10 Drawing Sheets

MULTI-SCALE-FACTOR IMAGE SUPER RESOLUTION WITH MICRO-STRUCTURED MASKS

CROSS REFERENCE TO RELATED APPLICATION

The present application claims priority to provisional application U.S. 63/065,608 filed on Aug. 14, 2020 which is hereby expressly incorporated by reference, in its entirety, into the present application.

BACKGROUND

1. Field

The present disclosure is directed to multi-scale-factor single image super resolution (SISR) framework, where, according to exemplary embodiments, only one model instance may be used to achieve SISR for different scale factors with, for example, guidance from multiple binary micro-structured masks.

2. Description of Related Art

ISO/IEC MPEG (JTC 1/SC 29/WG 11) has been actively searching for potential needs for standardization of future video coding technologies. ISO/IEC JPEG has established JPEG-AI group focusing on AI-based neural image compression using Deep Neural Networks (DNN). The Chinese AVS standard has also formed AVS-AI special group to work on neural image and video compression technologies. The success of AI technology and DNN in a large range of video applications such as semantic classification, target detection/recognition, target tracking, video quality enhancement, etc. poses a strong need for compressing the DNN models, and both MPEG and AVS are working on the Neural Network Compression standard (NNR), which compress DNN models to save both storage and computation.

At the same time, with the increasing popularity of high-resolution (HR) display, such as 4K (3840×2160) and 8K (7680×4320) resolutions, image/video SR has drawn great attention in industry to generate the matching HR image/video content. SIST aims at generating a HR image from a corresponding low-resolution (LR) image, and it has wide applications in surveillance imaging, medical imaging, immersive experience, and so on. In real-world scenarios, it is necessary for an SR system to zoom in the LR image with various scale factors tailored to different users.

SISR has achieved great success due to the recent development of DNNs. However, these SISR methods treat each scale factor as an individual task and train an individual model for each scale factor (e.g., ×2, ×3, or ×4). As a result, all these model instances need to be stored and deployed, which is too expensive to be practical, especially for scenarios with limited storage and computation resources like mobile devices.

Therefore, there is a desire for a technical solution to such problems.

SUMMARY

To address one or more different technical problems, this disclosure provides technical solutions to reduce network overhead and server computational overheads while delivering immersive video with respect to one or more viewport margin updates according to exemplary embodiments.

There is included a method and apparatus comprising memory configured to store computer program code and a processor or processors configured to access the computer program code and operate as instructed by the computer program code. The computer program includes obtaining code configured to cause the at least one processor to obtain an input low resolution (LR) image comprising a height, a width, and a number of channels, implementing code configured to cause the at least one processor to implement a feature learning deep neural network (DNN) configured to compute a feature tensor based on the input LR image, generating code configured to cause the at least one processor to generate, by an upscaling DNN, a high resolution (HR) image, having a higher resolution than the input LR image, based on the feature tensor computed by the feature learning DNN, wherein a networking structure of the upscaling DNN differs depending on different scale factors, and wherein a networking structure of the feature learning DNN is a same structure for each of the different scale factors.

According to exemplary embodiments, the generating code is further, at a test stage, code configured to cause the at least one processor to generate masked weight coefficients for the feature learning DNN based on the input LR image and a target scale factor, and based on the masked weight coefficients, select a subnetwork of the upscaling DNN for the target scale factor based on selected weight coefficients and computing the feature tensor through inference computation.

According to exemplary embodiments, generating the HR image is based on passing the feature tensor through an upscaling module using the selected weight coefficients.

According to exemplary embodiments, wherein weight coefficients of at least one of the feature learning DNN and the upscaling DNN comprise a 5-dimensional (5D) tensor with a size of $c_1, k_1, k_2, k_3, c_2$, an input of a layer of the at least one of the feature learning DNN and the upscaling DNN comprises a 4-dimensional (4D) tensor A with a size of $h_1, w_1, d_1, c_1$, and an output of the layer is a 4D tensor B with a size of $h_2, w_2, d_2, c_2$, and each of $c_1, k_1, k_2, k_3, c_2, h_1, w_1, d_1, c_1, h_2, w_2, d_2$, and $c_2$ are integer numbers greater than or equal to 1, and $h_1, w_1, d_1$ are a height, a weight, and a depth of the tensor A, and $h_2, w_2, d_2$ are a height, a weight, and a depth of the tensor B, and $c_1$ and $c_2$ are numbers of input and output channels respectively, and $k_1, k_2, k_3$ are sizes of a convolution kernel and correspond to height, weight, and depth axes respectively.

According to exemplary embodiments, there is further reshaping code configured to cause the at least one processor to reshape the 5D tensor to a 3-dimensional (3D) tensor and to reshape the 5D tensor to a 2-dimensional (2D) matrix.

According to exemplary embodiments, the 3D tensor is of a size $c'_1, c'_2, k$, where $c'_1 \times c'_2 \times k = c_1 \times c_2 \times k_1 \times k_2 \times k_3$, and the 2D matrix is of a size $c'_1, c'_2$, where $c'_1 \times c'_2 = c_1 \times c_2 \times k_1 \times k_2 \times k_3$.

According to exemplary embodiments, there is further, at a training stage, fixing code configured to cause the at least one processor to fix weight coefficients that are masked, obtaining code configured to cause the at least one processor to obtain updated weight coefficients based on a learning process on weights of the feature learning DNN and weights of the upscaling DNN through a weight filling module, and conducting code configured to cause the at least one processor to conduct, based on the updated weight coefficients, a micro-structured pruning process to obtain a model instance and masks.

According to exemplary embodiments, the learning process comprises reinitializing the weight coefficients that have zero values by setting those weight coefficients to any of random initial values and corresponding weights of a previously learned model.

According to exemplary embodiments, the micro-structured pruning process comprises computing losses for each of a plurality of micro-structured blocks of at least one of the 3D tensor and the 2D matrix, and ranking the micro-structured blocks based on the computed losses.

According to exemplary embodiments, the micro-structured pruning process further comprises determining to stop the micro-structured pruning process based on whether a distortion loss reaches a threshold.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order.

Further, the embodiments may be implemented by processing circuitry (e.g., one or more processors or one or more integrated circuits). In one example, the one or more processors execute a program that is stored in a non-transitory computer-readable medium.

Figure 1:
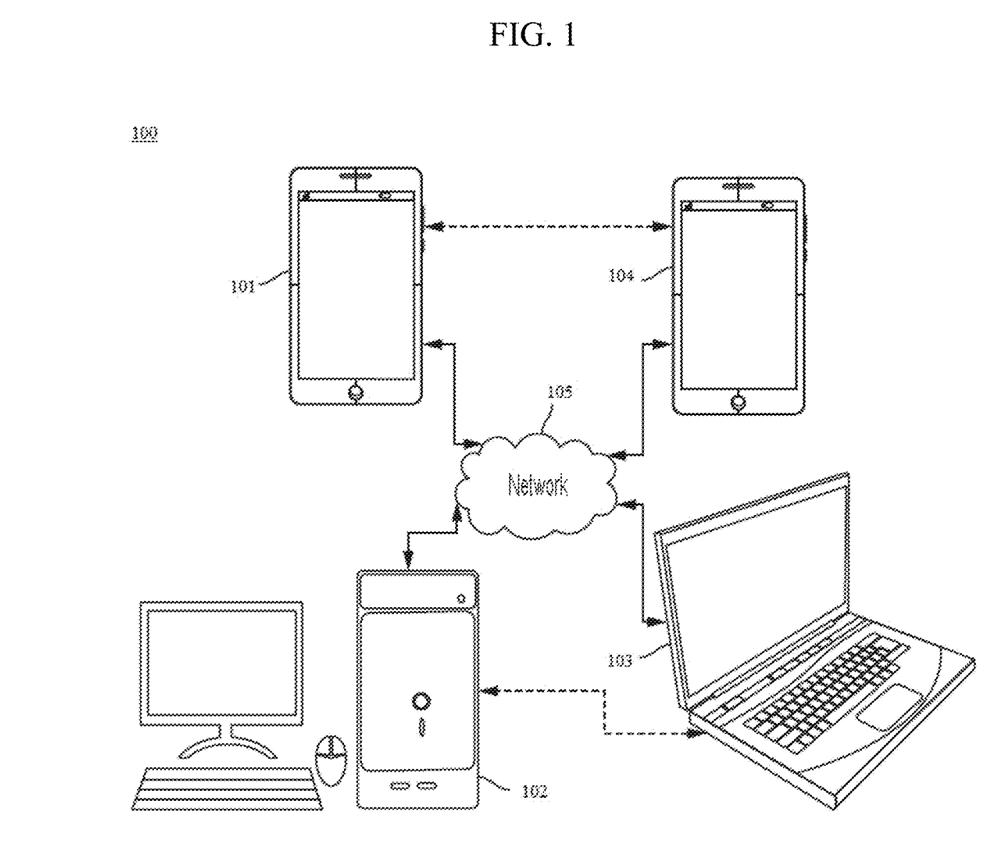
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
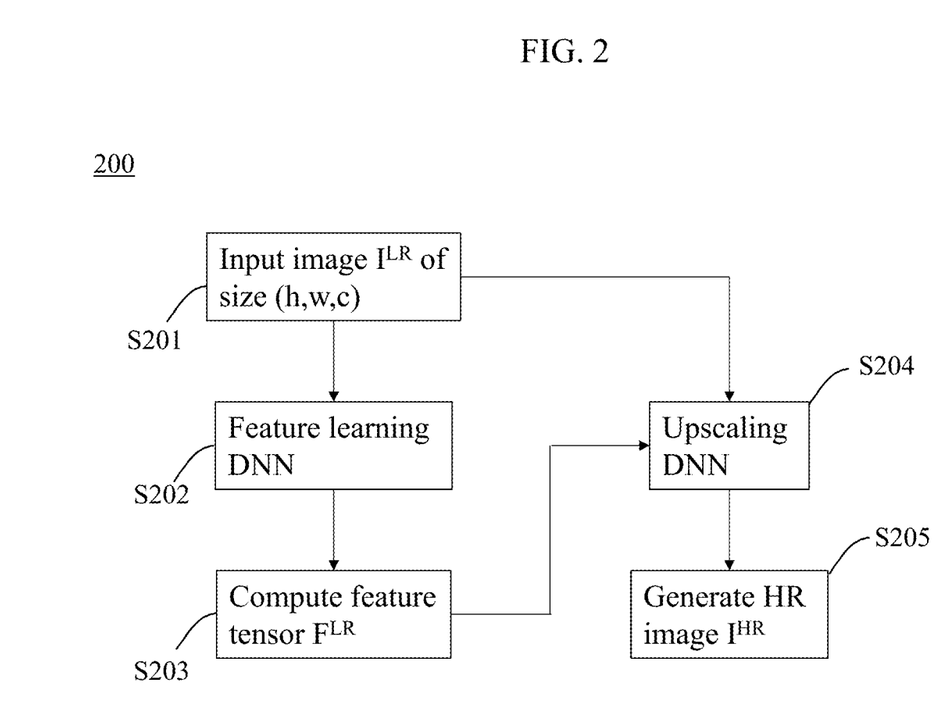
FIG. 2 is a simplified flow chart in accordance with embodiments.

FIG. 2 illustrates a flowchart 200 according to exemplary embodiments of the multi-scale-factor SISR framework described herein for learning and deploying only one SISR model instance that supports SISR with multiple scale factors. In particular, embodiments learn a set of binary masks, one for each targeted scale factor, to guide the SISR model instance to generate the HR image with different scale factors as described below.

For example, at S201, given an input image $I^{LR}$ of size (h,w,c), where h, w, c are the height, width, and number of channels, respectively, the overall SISR is a DNN that can be separated into two parts: a Feature Learning DNN at S202 and an Upscaling DNN at S204. The Feature Learning DNN at S202 aims at computing a feature tensor $F^{LR}$ at S203 based on the LR input image $I^{LR}$, and the Upscaling DNN aims at generating the HR image $I^{HR}$ at S205 based on the feature tensor $F^{LR}$. The network structure of the Upscaling DNN at S204 is related to the scale factor and is different for different scale factors, while the network structure of the Feature Learning DNN at S202 is irrelevant to the scale factor and is the same for all scale factors according to exemplary embodiments. The Feature Learning DNN is usually much larger (in terms of the number of DNN parameters) than the Upscaling DNN. According to exemplary embodiments, there may be obtained a set of N scale factors of interest $s_1, \ldots, s_N$ ranked in ascending order that may be desired for the SISR model to achieve. The overall structure of the SISR DNN is given in the diagram 300 of FIG. 3. For example, at the block 301, the $\{W_j^f\}$ denotes a set of weight coefficients of the Feature Learning DNN at S202, where each $W_j^f$ is the weight coefficients of the j-th layer. Additionally, $\{M_{ij}^f\}$ may denote a set of binary masks corresponding to the scale factor $s_i$, where each $M_{ij}^f$ has the same shape as $W_j^f$, and each entry of $M_{ij}^f$ is 1 or 0 indicating the corresponding weight entry in $W_j^f$ participates in the inference computation for generating the SR image of scale factor $s_i$ or not. Different from the Feature Learning DNN at S202, the Upscaling DNN at S204 comprises of several lightweight subnetworks such as at blocks 302, 303, and 304. According to exemplary embodiments, such $\{W_j^s(s_i)\}$ denotes a set of weight coefficients of the subnetwork of the Upscaling DNN at S204 corresponding to scale factor $s_i$, where each $W_j^s(s_i)$ is weight coefficients of the j-th layer.

Figure 3:
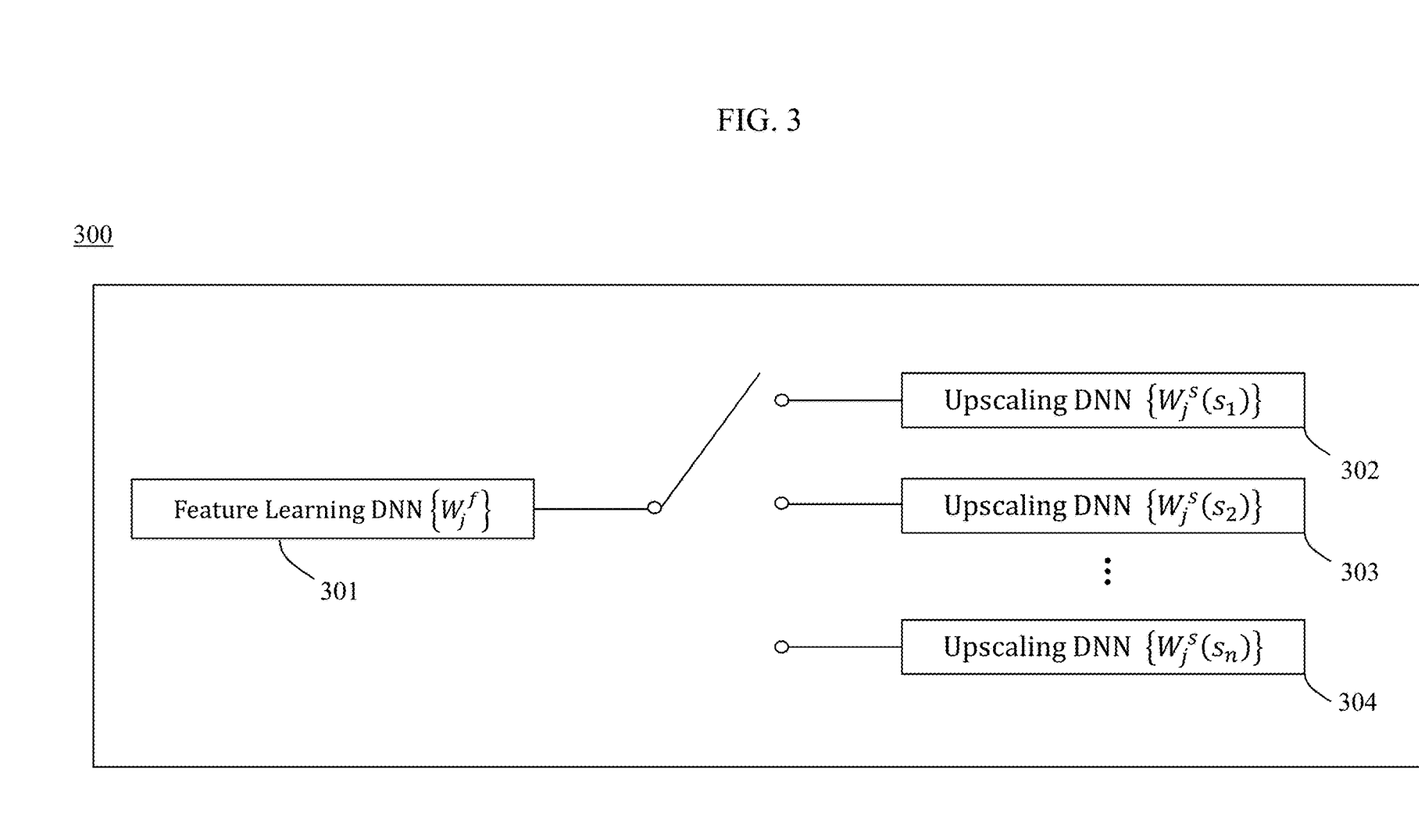
FIG. 3 is a simplified block diagram in accordance with embodiments.

Each weight coefficients $W_j^f$ or $W_j^s(s_i)$ is a general 5-Dimension (5D) tensor with size $(c_1, k_1, k_2, k_3, c_2)$. The input of the layer is a 4-Dimension (4D) tensor A of size $(h_1, w_1,$ $d_1, c_1$), and the output of the layer is a 4D tensor B of size ($h_2, w_2, d_2, c_2$). The sizes $c_1, k_1, k_2, k_3, c_2, h_1, w_1, d_1, h_2, w_2, d_2$ are integer numbers greater or equal to 1. When any of the sizes $c_1, k_1, k_2, k_3, c_2, h_1, w_1, d_1, h_2, w_2, d_2$ takes number 1, the corresponding tensor reduces to a lower dimension. Each item in each tensor is a floating number. The parameters $h_1, w_1$ and $d_1$ ($h_2, w_2$ and $d_2$) are the height, weight and depth of the input tensor A (output tensor B). The parameter $c_1$ ($c_2$) is the number of input (output) channel. The parameters $k_1, k_2$ and $k_3$ are the size of the convolution kernel corresponding to the height, weight and depth axes, respectively. The output B is computed through the convolution operation Θ based on input A, weight $W_j^f$ or $W_j^s$ ($s_i$), and mask $M_{ij}^f$ if available (note that for $W_j^s(s_i)$, embodiments can also associate a mask $M_j^s(s_i)$ to it, and all entries of $M_j^s(s_i)$ are set to be 1). That is, embodiments consider, at least in general, that B is computed as A convolving with masked weights $$W_{ij}^{f'} = W_j^f \cdot M_{ij}^f \text{ or } W_j^{s'}(s_i) = W_j^s(s_i) \cdot M_j^s(s_i) = W_j^s(s_i), \quad \text{—Eq. 1}$$

where · is element-wise multiplication.

Figure 4:
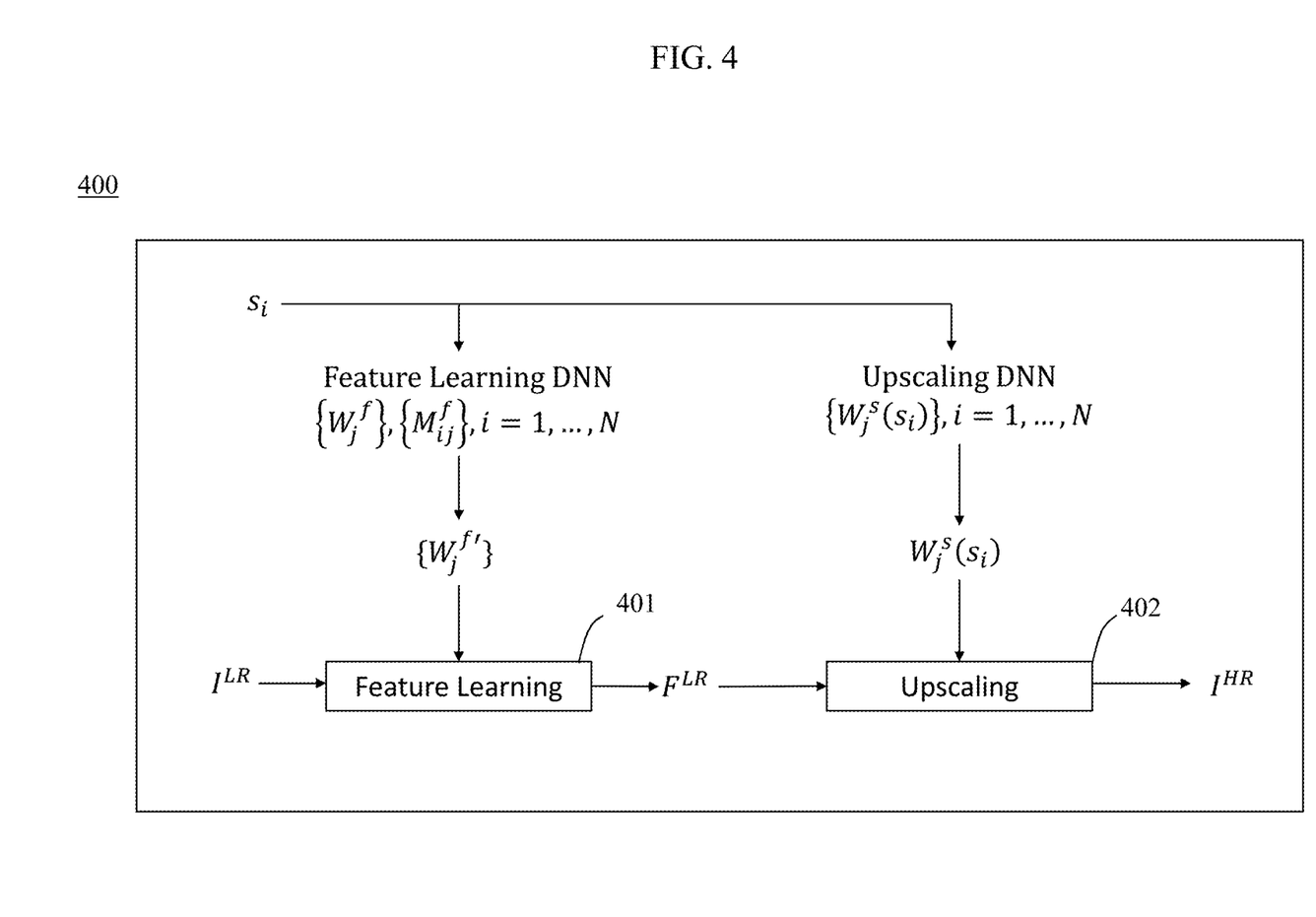
FIG. 4 is a simplified block diagram in accordance with embodiments.

Given the above mentioned learned weight coefficients $\{W_j^f\}, \{W_j^s(s_i), i=1, \ldots, N\}$, and masks $\{M_{ij}^f\}, i=1, \ldots, N$, the diagram 400 of FIG. 4 illustrates exemplary embodiments of a test stage according to exemplary embodiments. For example, given the input LR image $I^{LR}$ and the target scale factor $s_i$, the corresponding masks $\{M_{ij}^f\}$ is used to generate the masked weight coefficients $\{W_j^{f'}\}$ for the Feature Learning DNN, and the corresponding subnetwork of the Upscaling DNN for the scale factors; is selected with weight coefficients $W_j^s(s_i)$. Then using the masked weight coefficients $\{W_{ij}^{f'}\}$, the Feature Learning module at block 401 computes the feature $F^{LR}$ through inference computation, which is further passed through the Upscaling module at block 402 to generate the HR result $I^{HR}$ using the selected weight coefficients $W_j^s(s_i)$.

Figure 5:
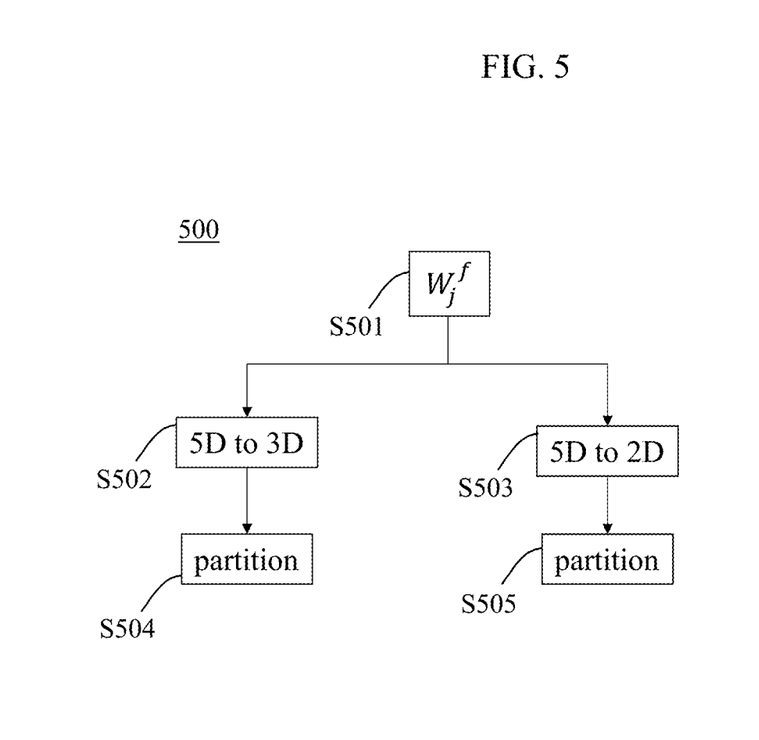
FIG. 5 is a simplified flow chart in accordance with embodiments.
Figure 6:
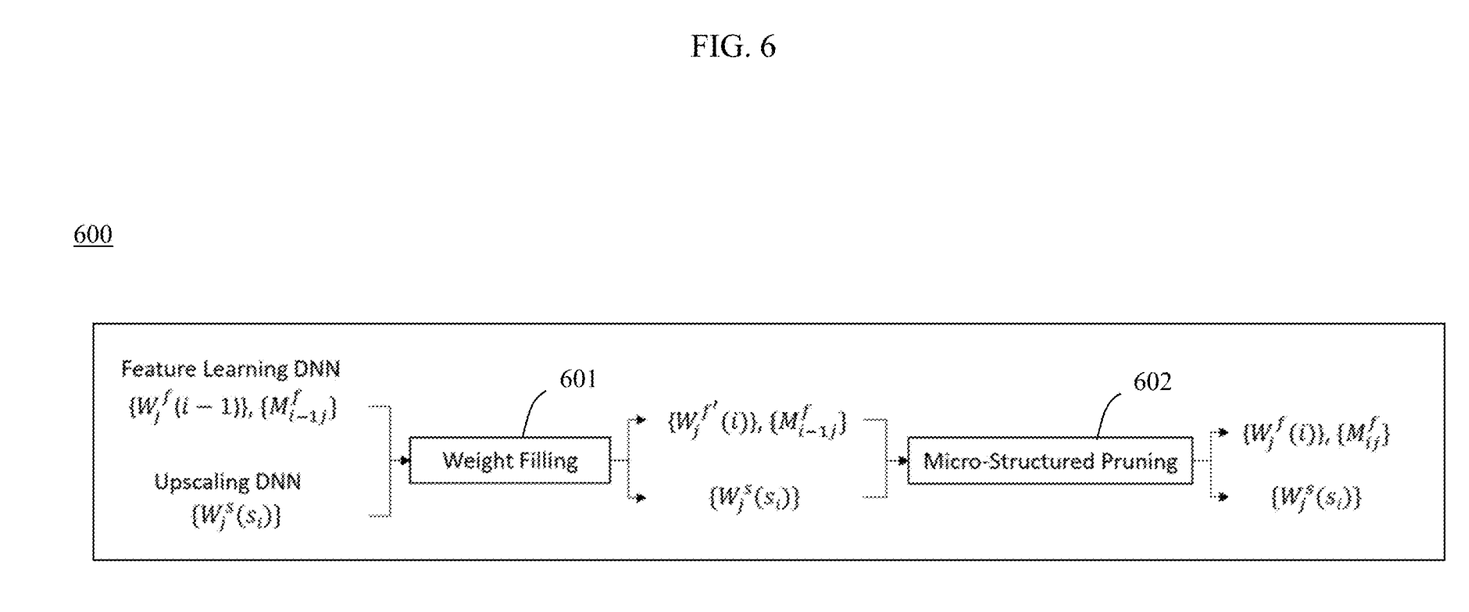
FIG. 6 is a simplified block diagram in accordance with embodiments.

According to exemplary embodiments, at the flowchart 500 of FIG. 4, a shape of each $W_j^f$ (so as each mask $M_{ij}^f$) can be changed, corresponding to the convolution of a reshaped input with the reshaped $W_j^f$ to obtain the same output. For example, such embodiments take configurations: (1), at S502, of a 5D weight tensor reshaped into a 3D tensor of size ($c'_1, c'_2, k$), where $$c'_1 \times c'_2 \times k = c_1 \times c_2 \times k_1 \times k_2 \times k_3 \text{ (for example, a preferred configuration is } c'_1 = c_1, c'_2 = c_2, k = k_1 \times k_2 \times k_3), \quad \text{—Eq. 2}$$

and (2), at S503, a 5D weight tensor is reshaped into a 2D matrix of size ($c'_1, c'_2$), where $$c'_1 \times c'_2 = c_1 \times c_2 \times k_1 \times k_2 \times k_3 \text{ (for example, some preferred configurations are } c'_1 = c_1, c'_2 = c_2 \times k_1 \times k_2 \times k_3, \text{ or } c'_2 = c_2, c'_1 = c_1 \times k_1 \times k_2 \times k_3). \quad \text{—Eq. 3}$$

Exemplary embodiments are designed with a desired micro-structure of the masks to align with the underlying GEMM matrix multiplication process of how the convolution operation is implemented so that the inference computation of using the masked weight coefficients can be accelerated. According to exemplary embodiments, there may be use of a block-wise micro-structures for the masks (so as the masked weight coefficients) of each layer in the 3D reshaped weight tensor or the 2D reshaped weight matrix, and specifically, for the case of reshaped 3D weight tensor, there is partitioning, at S504, partition of it into blocks of size ($g_i, g_o, g_k$), and for the case of reshaped 2D weight matrix, there is partitioning, at S505, of it into blocks of size ($g_i, g_o$). All items in a block of a mask will have the same binary value 1 or 0; that is, weight coefficients are masked out in the block-wise micro-structured fashion according to exemplary embodiments.

Figure 7:
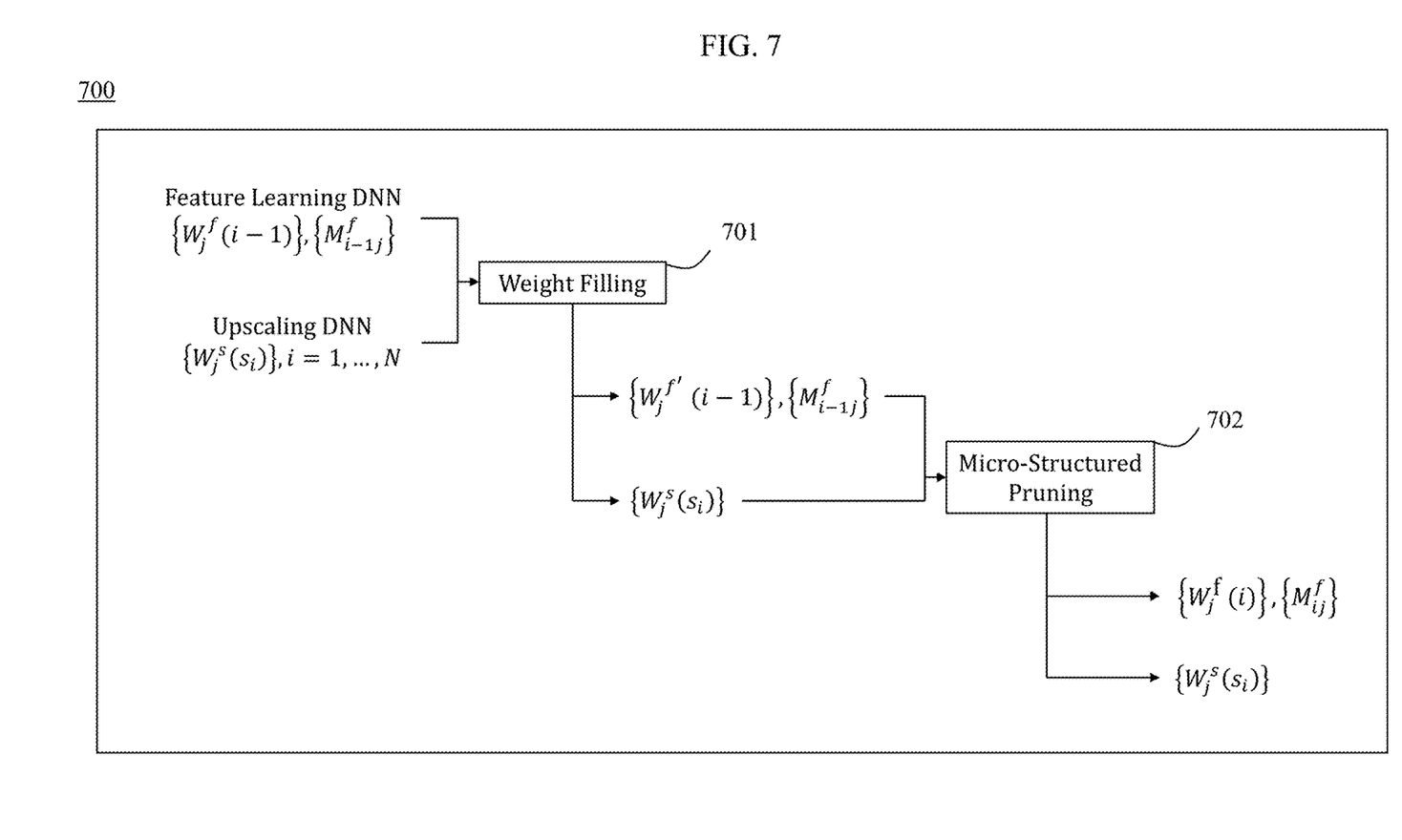
FIG. 7 is a simplified block diagram in accordance with embodiments.

The exemplary embodiments illustrated by diagram 700 in FIG. 7 illustrates an overall workflow of a training stage according to exemplary embodiments where a goal is to a the model instance with weights $\{W_j^f\}$ and $\{W_j^s(s_i)\}$ and the set of micro-structured masks $\{M_{ij}^f\}$, for $i=1, \ldots, N$, each $\{M_{ij}^f\}$ and $\{W_j^s(s_i)\}$ targeting at each scale factor of interest $s_i$. As such, there is disclosed a progressive multi-stage training framework to achieve this goal representing technical advantages to the problems noted herein.

As shown in FIG. 7, embodiments are described under an assumption of attempting to train masks targeting at $s_i$, and there is a current model instance with weights $\{W_j^f(i-1)\}$ and the corresponding masks $\{M_{i-1,j}^f\}$. Also, for the current scale factor $s_i$, there is a corresponding Upscaling DNN with weight coefficients $\{W_j^s(s_i)\}$ to learn. In other words, a goal is to obtain masks $\{M_{ij}^f\}$ and the updated weight coefficients $\{W_j^f(i)\}$ and the new weight coefficients $\{W_j^s(s_i)\}$. As such, there is firstly fixing of weight coefficients in $\{W_j^f(i-1)\}$ that are masked by $\{M_{i-1,j}^f\}$. For example, in the preferred embodiment, if an entry in $M_{i-1,j}^f$ is 1, the corresponding weight in $W_j^f(i-1)$ will be fixed. Actually, the remaining weight coefficients corresponding to 0 entries in $M_{i-1,j}^f$ have 0 values. Then, there is a learning process to fill up these unfixed zero-valued weights for the Feature Learning DNN and the weights $\{W_j^s(s_i)\}$ for the Upscaling DNN, through the Weight Filling module 701. This results in a set of updated weight coefficients $\{W_j^{f'}(i)\}$ and $\{W_j^s(s_i)\}$. Then based on $\{W_j^{f'}(i)\}, \{M_{i-1,j}^f\}$, and $\{W_j^s(s_i)\}$, embodiments conduct micro-structured pruning through the Micro-Structured Pruning module 702 to obtain the model instance and masks $\{W_j^f\}, \{M_{ij}^f\}, \{W_j^s(s_i)\}$.

Figure 8:
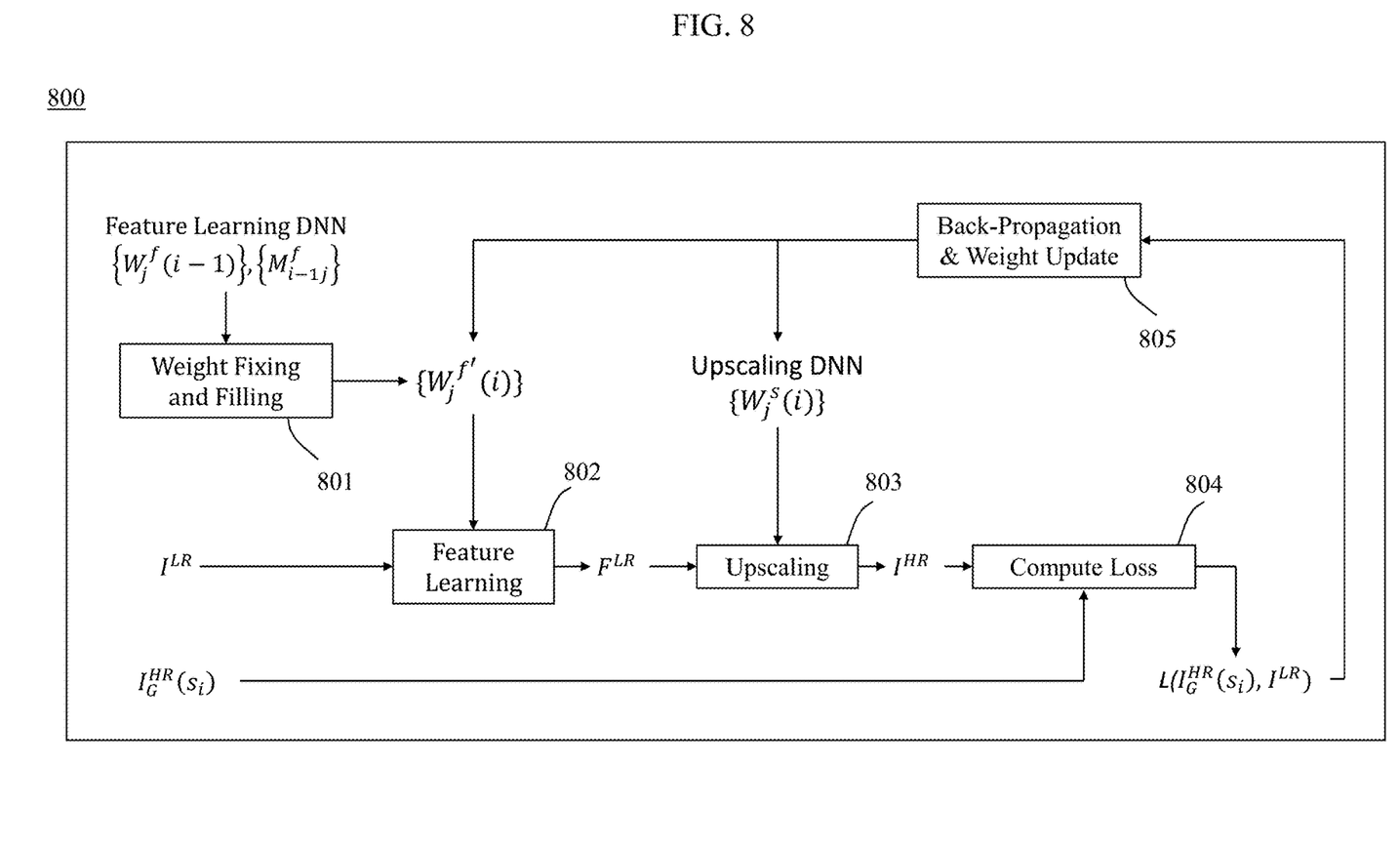
FIG. 8 is a simplified block diagram in accordance with embodiments.

Further exemplary embodiments, such as at FIG. 8 illustrate a diagram 800 wherein there is further illustrated a detailed workflow of the Weight Filling module 801 of FIG. 8. For example, given the current weights $\{W_j^f(i-1)\}$ and the corresponding masks $\{M_{i-1,j}^f\}$ in the Weight Fixing and Filling module 801, there is a fixing of those weight coefficients in $\{W_j^f(i-1)\}$ that are masked by $\{M_{i-1,j}^f\}$, and there is a reinitializing of the remaining weight coefficients in $\{W_j^f(i-1)\}$ that have zero values (e.g., by setting them to some randomly initial values or using the corresponding weights of a previously learned full model such as the first full model with weights $\{W_j^f(0)\}$). This gives the weight coefficients $\{_j^{f'}(i)\}$ for the Feature Learning DNN. Also, the weights $\{W_j^s(s_i)\}$ of the Upscaling DNN are initialized (e.g., by setting them to some randomly initialized value or using the corresponding weights of some previously learned full model such as an individual full model trained for the current scale factor $s_i$). After that, the training input image $I^{LR}$ is passed through the Feature Learning DNN to compute the feature $F^{LR}$ in the Feature Learning module 802 using $\{W_j^{f'}(i)\}$. $F^{LR}$ is further passed through the Upscaling DNN to compute the HR image $I^{HR}$ in the Upscaling module 803 using $\{W_j^s(s_i)\}$. For the training purpose, each training input LR image $I^{LR}$ has a corresponding ground-truth HR image $I_G^{HR}(s_i)$ for the current scale factor $s_i$. The general goal of training is to minimize the distortion between the ground-truth image $I_G^{HR}(s_i)$ and the estimated HR image $I^{HR}$. A distortion loss $L(I_G^{HR}(s_i), I^{HR})$ can be computed to measure the distortion in the Compute Loss module 804, such as the $L_1$ or $L_2$ norm of the difference between $I_G^{HR}(s_i)$ and $I^{HR}$. The gradient of this loss can be computed to update the unfixed weight coefficients in $\{W_j^{f'}(i)\}$ of the Feature Learning DNN and the weight coefficients $\{W_j^s(s_i)\}$ of the Upscaling DNN in the Back-Propagation & Weight Update module. Typical, multiple epoch iterations will be taken to optimize the loss $L(I_G^{HR}(s_i), I^{HR})$ in this Back-Propagation & Weight Update module 805, e.g., until reaching a maximum iteration number or until the loss converges.

Figure 9:
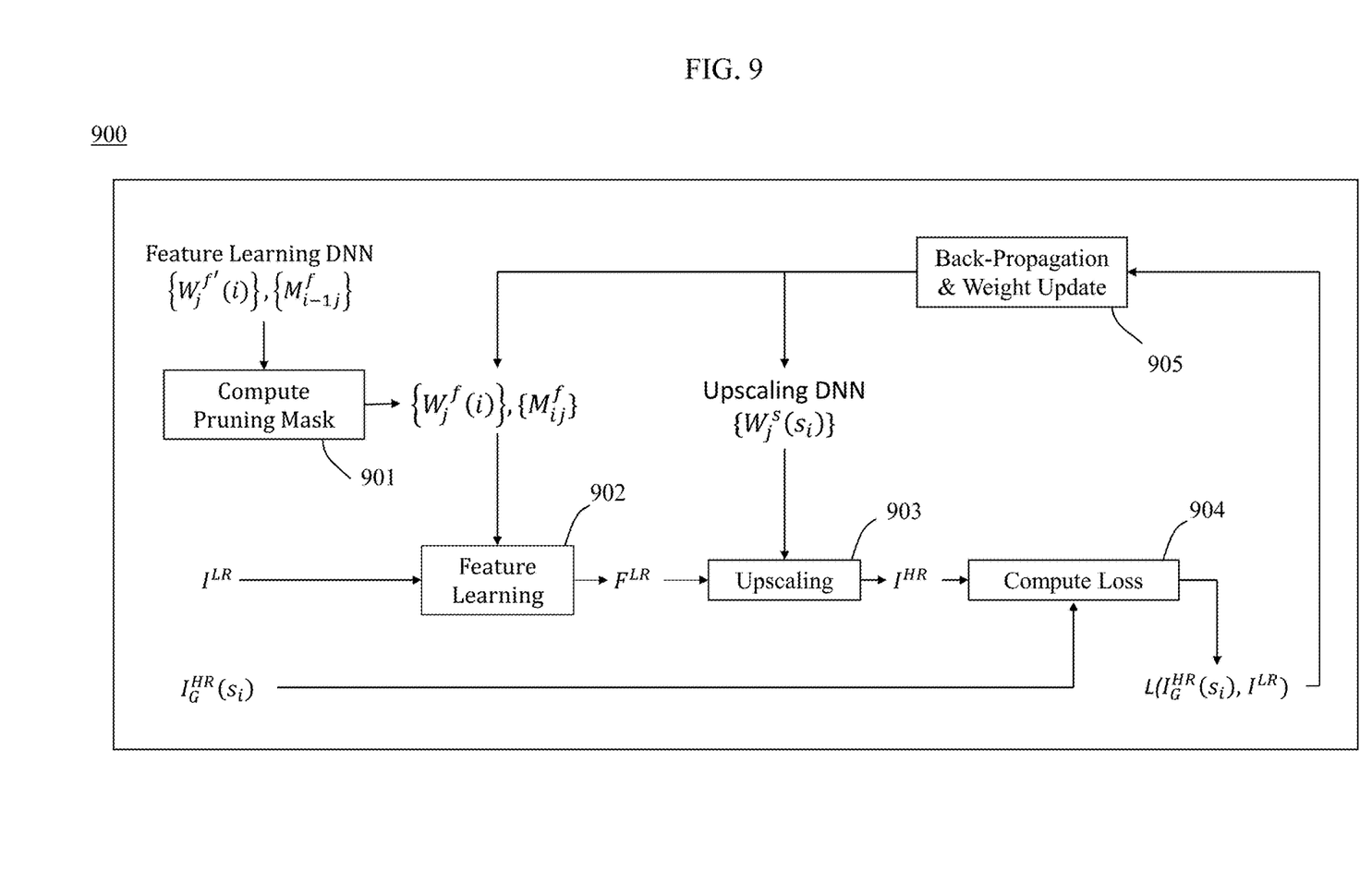
FIG. 9 is a simplified block diagram in accordance with embodiments.

According to exemplary embodiments, FIG. 9 illustrates a diagram 900 with which there is further described a more detailed workflow of the Micro-Structured Pruning module 702 of FIG. 7. For example, given the updated weights $\{W_j^f(i)\}$ of the Feature Learning DNN and $\{W_j^s(i)\}$ of the Upscaling DNN from the above Weight Filling module 701, as well as the current masks $\{M_{i-1,j}^f\}$, there is first a computing of the pruning masks $\{M_{ij}^f\}$ in the Compute Pruning Mask module 901.

There is, according to exemplary embodiments, fixing of the weight coefficients in $\{W_j^f(i)\}$ that are masked by $\{M_{i-1,j}^f\}$, and for the remaining unfixed weight coefficients in $\{W_j^f(i)\}$, at block 904, there is computing of a pruning loss $L_p(b)$ (e.g., the $L_1$ or $L_2$ norm of the weights in the block) for each micro-structured block b (3D block for 3D reshaped weight tensor or 2D block for 2D reshaped weight matrix) as mentioned before. Further, there is ranking of these micro-structured blocks based on their pruning loss in ascending order and prune the blocks (i.e., by setting the corresponding weights in the pruned blocks as 0) top down from the ranked list until we reach a stop criterion. For example, given a validation dataset $S_{val}$, the SISR model with weights $\{W_j^f(i)\}$ and $\{W_j^s(s_i)\}$ can generate a distortion loss $$L_{val} = \sum_{I_G^{HR}(s_i) \in S_{val}} L(I_G^{HR}(s_i), I^{HR}) \quad \text{Eq. 4}$$

As more and more micro-blocks are pruned, this distortion loss will gradually increase. The stop criterion can be a tolerable percentage threshold that may allow the distortion loss to increase. The stop criterion can also be a simple percentage (e.g., 50%) of the micro-structured blocks to prune. A set of binary pruning masks $\{P_{ij}^f\}$ can be generated, where an entry in a mask $P_{ij}^f$ is 1 means the corresponding weight in $W_j^f(i)$ is pruned. Then there is a fixing of the additional unfixed weights in $W_j^f(i)$ that are masked by $\{P_{ij}^f\}$ as being pruned, and update the remaining weights in $W_j^f(i)$ that are not masked by either $\{P_{ij}^f\}$ or $\{M_{i-1,j}^f\}$, and update the weights $\{W_j^s(s_i)\}$, by regular back-propagation to optimize the distortion loss $L(I_G^{HR}(s_i), I^{HR})$ over the training data. Typical, multiple epoch iterations will be taken to optimize the distortion loss in this Back-Propagation & Weight Update process at block 905, e.g., until reaching a maximum iteration number or until the loss converges.

The corresponding masks $\{M_{ij}^f\}$ can be computed as $$M_{ij}^f = M_{i-1,j}^f \cup P_{ij}^f \quad \text{—Eq. 5}$$

That is, the non-pruned entries in $P_{ij}^f$ that are not masked in $M_{i-1,j}^f$ will be additionally set to 1 as being masked in $M_{ij}^f$. Also, the above Micro-Structured Weight Pruning process will output the updated weights $\{W_j^f(i)\}$ and $\{W_j^s(s_i)\}$. Note that the above micro-structured pruning process can also be applied to $\{W_j^s(s_i)\}$ optionally, to further reduce the model size and inference computation. That is, in the Compute Pruning Mask module 901, there may also be a reshaping and partitioning of weights of the Upscaling DNN from block 903 to micro-structures, compute the pruning loss of those micro-structures, and prune top ranked micro-structures with small pruning loss. Further, embodiments may optionally choose to do so as a tradeoff between reducing the SISR distortion and saving storage and computation.

Finally, the last updated weights $\{W_j^f(N)\}$ are the final output weights $\{W_j^f\}$ for the Feature Learning DNN of the learned model instance according to exemplary embodiments.

In view of the above-embodiments, and compared with any previous attempts at SISR methods, this disclosure offer technical benefits such as largely reduced deployment storage to achieve SISR with multiple scale factors, a flexible and general framework that accommodates various types of underlying SISR models, and that the micro-structured masks provide additional benefit of computation reduction.

The techniques described above, can be implemented as computer software using computer-readable instructions and physically stored in one or more computer-readable media or by a specifically configured one or more hardware processors. For example, FIG. 10 shows a computer system 1000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
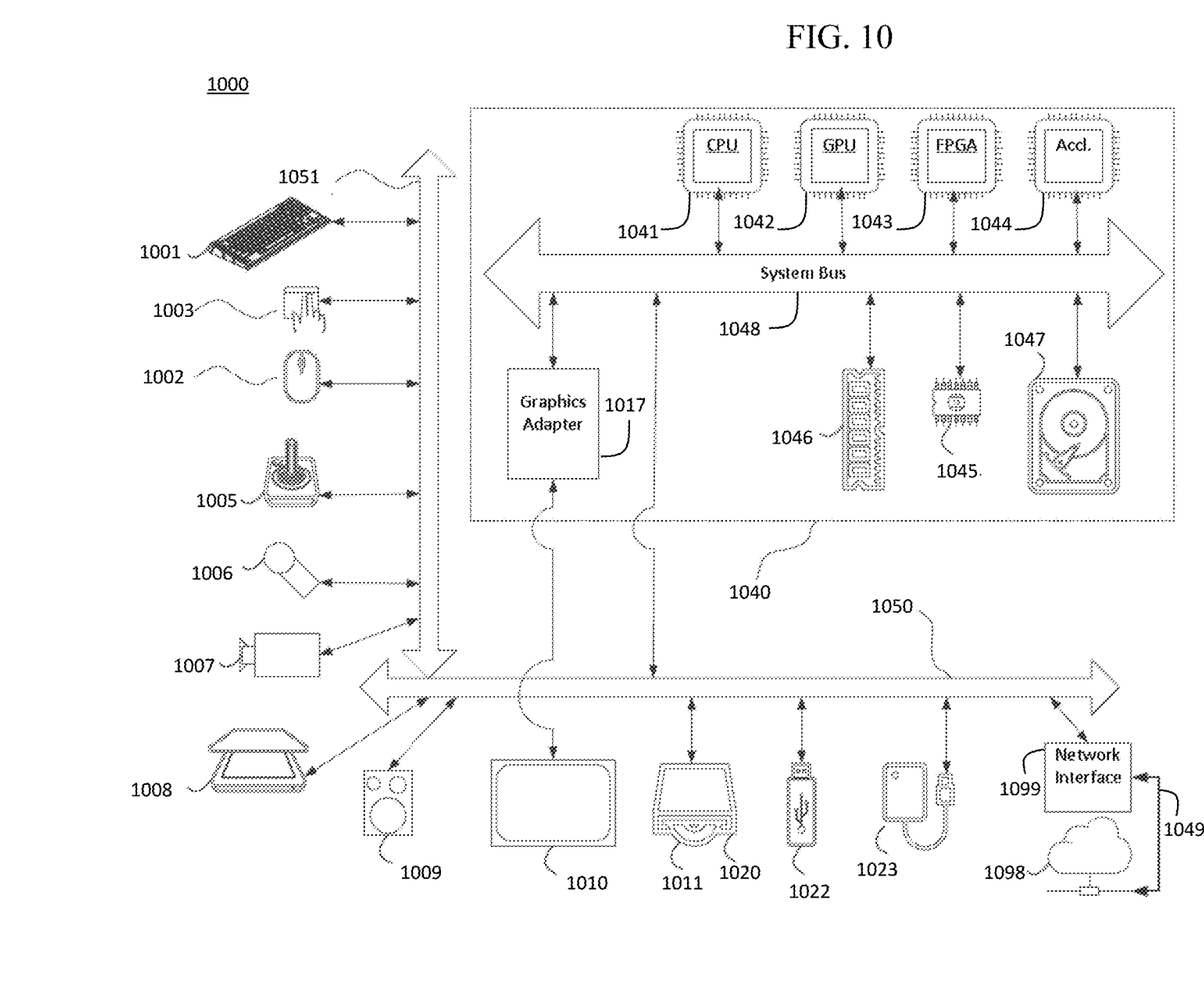
FIG. 10 is a schematic illustration in accordance with embodiments.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, joystick 1005, microphone 1006, scanner 1008, camera 1007.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, or joystick 1005, but there can also be tactile feedback devices that do not serve as input devices), audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD 1011 or the like media, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface 1099 to one or more communication networks 1098. Networks 1098 can for example be wireless, wireline, optical. Networks 1098 can further be local, wide-area, metropolitan, vehicular and industrial, real-time, delay-tolerant, and so on. Examples of networks 1098 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1098 commonly require external network interface adapters that attached to certain general-purpose data ports or peripheral buses (1050 and 1051) (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks 1098, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, a graphics adapter 1017, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1051. Architectures for a peripheral bus include PCI, USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieval to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for image processing, the method performed by at least one processor and comprising:
    obtaining an input low resolution (LR) image comprising a height, a width, and a number of channels;
    implementing a feature learning deep neural network (DNN) configured to compute a feature tensor based on the input LR image;
    generating, by an upscaling DNN, a high resolution (HR) image, having a higher resolution than the input LR image, based on the feature tensor computed by the feature learning DNN, wherein a networking structure of the upscaling DNN differs depending on different scale factors, and wherein a networking structure of the feature learning DNN is a same structure for each of the different scale factors.

2. The method according to claim 1, further, at a test stage, comprising:

generating masked weight coefficients for the feature learning DNN based on a target scale factor; and selecting a subnetwork of the upscaling DNN for the target scale factor based on selected weight coefficients and computing the feature tensor through inference computation.

3. The method according to claim 2, further comprising:

generating the HR image based on passing the feature tensor through an upscaling module using the selected weight coefficients.

4. The method according to claim 1, wherein weight coefficients of at least one of the feature learning DNN and the upscaling DNN comprise a 5-dimensional (5D) tensor with a size of $c_1$, $k_1$, $k_2$, $k_3$, $c_2$, wherein an input of a layer of the at least one of the feature learning DNN and the upscaling DNN comprises a 4-dimensional (4D) tensor A with a size of $h_1$, $w_1$, $d_1$, $c_1$, wherein an output of the layer is a 4D tensor B with a size of $h_2$, $w_2$, $d_2$, $c_2$, and wherein each of $c_1$, $k_1$, $k_2$, $k_3$, $c_2$, $h_1$, $w_1$, $d_1$, $c_1$, $h_2$, $w_2$, $d_2$, and $c_2$ are integer numbers greater than or equal to 1, wherein $h_1$, $w_1$, $d_1$ are a height, a weight, and a depth of the tensor A, wherein $h_2$, $w_2$, $d_2$ are a height, a weight, and a depth of the tensor B, wherein $c_1$ and $c_2$ are numbers of input and output channels respectively, and wherein $k_1$, $k_2$, $k_3$ are sizes of a convolution kernel and correspond to height, weight, and depth axes respectively.

5. The method according to claim 4, further comprising:

reshaping the 5D tensor to a 3-dimensional (3D) tensor; and reshaping the 5D tensor to a 2-dimensional (2D) matrix.

6. The method according to claim 5, wherein the 3D tensor is of a size $c'_1$, $c'_2$, k, where $c'_1 \times c'_2 \times k = c_1 \times c_2 \times k_1 \times k_2 \times k_3$, and wherein the 2D matrix is of a size $c'_1$, $c'_2$, where $c'_1 \times c'_2 = c_1 \times c_2 \times k_1 \times k_2 \times k_3$.

7. The method according to claim 6, further, at a training stage, comprising:

fixing weight coefficients that are masked;

obtaining updated weight coefficients based on a learning process on weights of the feature learning DNN and weights of the upscaling DNN through a weight filling module; and conducting, based on the updated weight coefficients, a micro-structured pruning process to obtain a model instance and masks.

8. The method according to claim 7, wherein the learning process comprises reinitializing the weight coefficients that have zero values by setting those weight coefficients to any of random initial values and corresponding weights of a previously learned model.

9. The method according to claim 7, wherein the micro-structured pruning process comprises:

computing losses for each of a plurality of micro-structured blocks of at least one of the 3D tensor and the 2D matrix; and ranking the micro-structured blocks based on the computed losses.

10. The method according to claim 9, wherein the micro-structured pruning process further comprises:

determining to stop the micro-structured pruning process based on whether a distortion loss reaches a threshold.

11. An apparatus for image processing, the apparatus comprising:

at least one memory configured to store computer program code;

at least one processor configured to access the computer program code and operate as instructed by the computer program code, the computer program code including:

obtaining code configured to cause the at least one processor to obtain an input low resolution (LR) image comprising a height, a width, and a number of channels;

implementing code configured to cause the at least one processor to implement a feature learning deep neural network (DNN) configured to compute a feature tensor based on the input LR image;

generating code configured to cause the at least one processor to generate, by an upscaling DNN, a high resolution (HR) image, having a higher resolution than the input LR image, based on the feature tensor computed by the feature learning DNN, wherein a networking structure of the upscaling DNN differs depending on different scale factors, and wherein a networking structure of the feature learning DNN is a same structure for each of the different scale factors.

12. The apparatus according to claim 11, wherein the generating code is further, at a test stage, code configured to cause the at least one processor to:

generate masked weight coefficients for the feature learning DNN based on a target scale factor; and select a subnetwork of the upscaling DNN for the target scale factor based on selected weight coefficients and computing the feature tensor through inference computation.

13. The apparatus according to claim 12, wherein generating the HR image is based on passing the feature tensor through an upscaling module using the selected weight coefficients.

14. The apparatus according to claim 11, wherein weight coefficients of at least one of the feature learning DNN and the upscaling DNN comprise a 5-dimensional (5D) tensor with a size of $c_1$, $k_1$, $k_2$, $k_3$, $c_2$, wherein an input of a layer of the at least one of the feature learning DNN and the upscaling DNN comprises a 4-dimensional (4D) tensor A with a size of $h_1$, $w_1$, $d_1$, $c_1$, wherein an output of the layer is a 4D tensor B with a size of $h_2$, $w_2$, $d_2$, $c_2$, and wherein each of $c_1$, $k_1$, $k_2$, $k_3$, $c_2$, $h_1$, $w_1$, $d_1$, $c_1$, $h_2$, $w_2$, $d_2$, and $c_2$ are integer numbers greater than or equal to 1, wherein $h_1$, $w_1$, $d_1$ are a height, a weight, and a depth of the tensor A, wherein $h_2$, $w_2$, $d_2$ are a height, a weight, and a depth of the tensor B, wherein $c_1$ and $c_2$ are numbers of input and output channels respectively, and wherein $k_1$, $k_2$, $k_3$ are sizes of a convolution kernel and correspond to height, weight, and depth axes respectively.

15. The apparatus according to claim 14, further comprising:
reshaping code configured to cause the at least one processor to reshape the 5D tensor to a 3-dimensional (3D) tensor and to reshape the 5D tensor to a 2-dimensional (2D) matrix.

16. The apparatus according to claim 15,
wherein the 3D tensor is of a size $c'_1$, $c'_2$, k, where $c'_1 \times c'_2 \times k = c_1 \times c_2 \times k_1 \times k_2 \times k_3$, and
wherein the 2D matrix is of a size $c'_1$, $c'_2$, where $c'_1 \times c'_2 = c_1 \times c_2 \times k_1 \times k_2 \times k_3$.

17. The apparatus according to claim 16, further, at a training stage, comprising:
fixing code configured to cause the at least one processor to fix weight coefficients that are masked;
obtaining code configured to cause the at least one processor to obtain updated weight coefficients based on a learning process on weights of the feature learning DNN and weights of the upscaling DNN through a weight filling module; and
conducting code configured to cause the at least one processor to conduct, based on the updated weight coefficients, a micro-structured pruning process to obtain a model instance and masks.

18. The apparatus according to claim 17,
wherein the learning process comprises reinitializing the weight coefficients that have zero values by setting those weight coefficients to any of random initial values and corresponding weights of a previously learned model.

19. The apparatus according to claim 17, wherein the micro-structured pruning process comprises:
computing losses for each of a plurality of micro-structured blocks of at least one of the 3D tensor and the 2D matrix; and
ranking the micro-structured blocks based on the computed losses.

20. A non-transitory computer readable medium storing a program causing a computer to execute a process, the process comprising:
obtaining an input low resolution (LR) image comprising a height, a width, and a number of channels;
implementing a feature learning deep neural network (DNN) configured to compute a feature tensor based on the input LR image;
generating, by an upscaling DNN, a high resolution (HR) image, having a higher resolution than the input LR image, based on the feature tensor computed by the feature learning DNN,
wherein a networking structure of the upscaling DNN differs depending on different scale factors, and
wherein a networking structure of the feature learning DNN is a same structure for each of the different scale factors.

* * * * *